C. SOLLIMA.
MECHANICAL DEVICE FOR TRANSMITTING AND REGULATING SPEED.
APPLICATION FILED AUG. 22, 1918.
1,336,542.  
Patented Apr. 13, 1920.
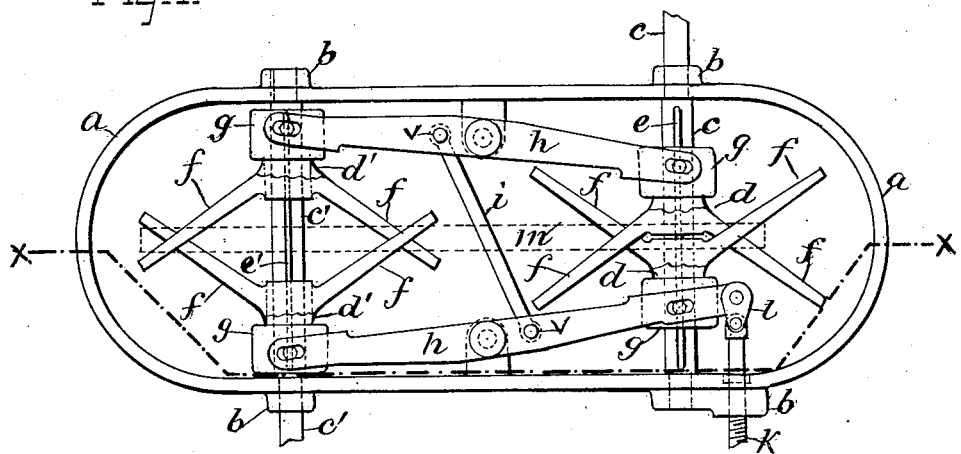
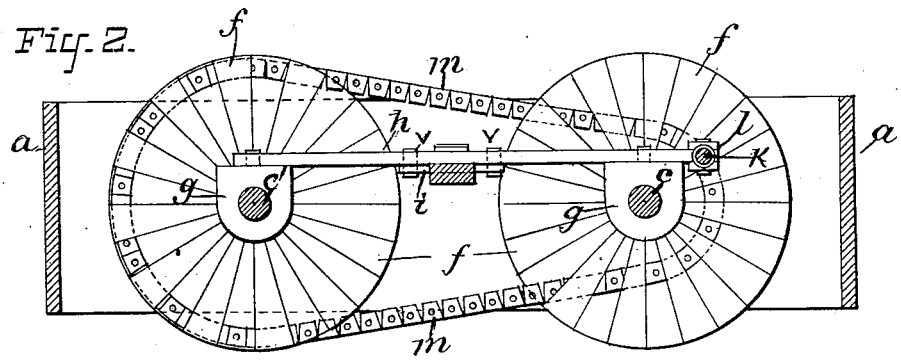
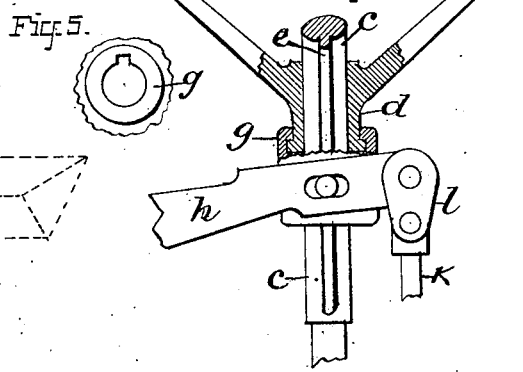
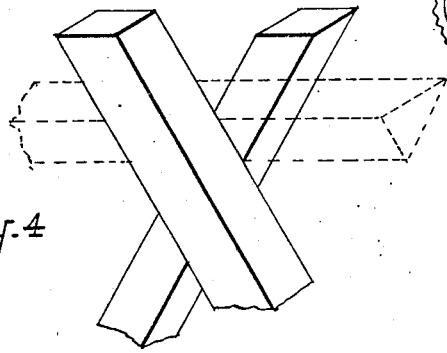
INVENTOR  
Carmelo Sollima
BY  
J. A. Hurdle  
ATTORNEY

UNITED STATES PATENT OFFICE.

CARMELO SOLLIMA, OF PARIS, FRANCE, ASSIGNOR OF ONE-HALF TO ANTONIO SOLLIMA, OF BROOKLYN, NEW YORK.

MECHANICAL DEVICE FOR TRANSMITTING AND REGULATING SPEED.

1,336,542.  Specification of Letters Patent.  Patented Apr. 13, 1920.

Application filed August 22, 1918. Serial No. 251,034.

*To all whom it may concern:*

Be it known that I, CARMELO SOLLIMA, citizen of the Republic of France, and resident of the city of Paris, have invented a certain new and useful Mechanical Device for Transmitting and Regulating Speed, of which the following is a specification.

The invention relates to a new article of manufacture for transmitting and regulating speed in machinery where an increase or decrease of speed is essential, and is accomplished without the use of gears of any description whatever, thus making it adaptable for motor cars, etc., all of which will be fully described hereinafter.

The invention consists of naves or hubs provided with a series of radially arranged arms which may be integral or fixed thereto at an inclined angle to the axis of the aforesaid hub, the latter of which are slidably mounted in pairs upon a rotatable shaft. Said hubs are operated by levers or otherwise. The hubs when operated upon may move toward each other or vice versa depending, of course, whether increase or decrease speed is required.

In the drawings, Figure 1 represents a plan view showing some of the radially arranged arms of the hubs partly broken away, and the belt connecting the rearward pair of hubs with that of the forward hubs is shown in dotted lines, thus showing the exact construction of the path through which the belt travels when in motion.

Fig. 2 represents a section taken on line *x. x.* of Fig. 1.

Fig. 3 is an enlarged detached view of the hubs showing the manner in which they may be coupled with means operated by hand levers.

Fig. 4 is a diagrammatic view which illustrates the manner in which the radially arranged arms of the hubs cross each other when forming the angular gully or trough through which the belt travels when in action.

Fig. 5 represents an end view of the hubs showing the keyway or feather channel of the hubs.

Similar letters refer to similar parts throughout the drawings in which the frame $a$ is provided with bearings $b$ adapted to receive the journals of the rotatable shafts $c$ $c'$ upon each of which is mounted a pair of hubs $d$ $d'$ adapted to have a rotatable and slidable movement. The hubs $d$ $d'$ are held in alinement parallel with the axis of the rotatable shaft $c$ $c'$ by means of the keys or feathers $e$ $e'$. The ends of the hubs $d$ $d'$ facing each other are provided with the radially arranged inclined arms $f$ which cross each other when the hubs $d$ $d'$ move toward or from each other, which movement changes the diameter of the circumferential path of the belt working surface.

Each of the hubs $d$ $d'$ are swiveled to a slidable sleeve $g$ as shown in detail Fig. 3. Each of the sleeves $g$ engage with the ends of the swing levers $h$, having their fulcrums located centrally between their ends, said levers $h$ connected one with the other by an obliquely arranged cross-bar $i$ having its ends loosely connected to their respective levers at $v$ $v$. The end of one of the swinging levers $h$ is extended and is connected with the operating rod $k$ by the link $l$.

The principal characteristic of the slidable hubs is that they are grouped by pairs and provided with radially arranged arms inclined at an angle to the axis of the shafts or axles and crossing one another in such manner that their extremities form a trough or gully adaptable to receive the belt or cable $m$ connecting one pair of the slidable hubs with the other. The purpose being to produce, through drawing the hubs closer together or setting them farther apart, a variation in circumferential bearing, that is to say, that if the diameter of the gully or trough formed by the crossing inclined arms of one group of inclined arms should increase the other will decrease proportionally, thus maintaining the tension of the belt $m$ at all times.

This system of regulation dispenses with gearings of all description and insures a great reduction of general wear and tear upon the machinery or device with which it may be connected. The jerks that are usually produced when starting are thus avoided as well as those that occur when changing the speed.

The mechanism is simplified: it follows that there is a reduction of the multiple maneuvers, and a single uniform motion is established by means of the belt or cable connection. This system brings to a maximum the yield of the motor and insures a great economy in construction. It is adaptable in all mechanical applications where a variation or change of speed is desirable whether it is for stationary machines or for automobiles or other motors.

It will be obvious that when the axle $c'$ is united with the motor and the axle $c$ to the wheels of the car, the continuous belt will cause shaft $c$ to work simultaneously with that of shaft $c'$. It is not desired to limit the invention to the exact construction shown as the same may be modified in many particulars without departing from the spirit of my invention.

Applicant is aware that many mechanical devices have heretofore been made for transmitting and regulating speed. They, however, have been constructed of many loose parts which objection is overcome by the simplicity of construction as disclosed by applicant's invention.

Having thus described my invention what I claim as new and desire to secure by Letters Patent is:

1. In a device for regulating speed, the combination consisting of the rotatable shaft provided with a keyway, the pair of slidable hubs mounted thereon, the ends facing each other provided with radially arranged arms inclined forwardly, the pivoted swinging levers, each having one of its ends connected with the sleeve engaging with the slidable hubs, the obliquely arranged cross bar having its ends loosely connected with the aforesaid pivoted levers at relatively opposite sides of their pivots, and the controlling rod connected with the end of one of the said pivoted levers, the whole working in unison with the second pair of similar formed hubs by means of the continuous belt or cable.

2. In a device for transmitting and regulating speed for motors, the combination with slidable hubs, mounted in pairs provided with radially arranged arms inclined toward the opposite hub, the pivoted swinging levers, each having its ends loosely connected with the non-rotatable sleeve, the latter swiveled to the outer end of the slidable hubs, the obliquely arranged connecting bar having its ends pivoted to the pivoted swinging levers at relatively opposite sides of their pivots aforesaid, the controlling or operating rod connected with the extension of one of the pivoted swinging levers and the continuous belt engaging the inclined arms of the hubs aforesaid.

Signed at the city of Florence, Kingdom of Italy, this 25th day of July A. D., 1918.

CARMELO SOLLIMA.

Witnesses:
FREDERICK W. BULDROVY,
S. BLANDIN.